Sept. 24, 1963    C. R. WOLF ETAL    3,104,699
OVERHEAD DOOR CONSTRUCTION
Filed Aug. 17, 1959    8 Sheets-Sheet 4

INVENTORS:
CECIL R. WOLF
JOHN P. HOLLAND
BY PAUL F. SHARP

Sept. 24, 1963 C. R. WOLF ETAL 3,104,699
OVERHEAD DOOR CONSTRUCTION
Filed Aug. 17, 1959 8 Sheets-Sheet 7

INVENTORS:
CECIL R. WOLF
JOHN P. HOLLAND
BY PAUL F. SHARP

United States Patent Office 3,104,699
Patented Sept. 24, 1963

3,104,699
OVERHEAD DOOR CONSTRUCTION
Cecil R. Wolf and John P. Holland, Rock Falls, and Paul F. Sharp, Sterling, Ill., assignors to Frantz Manufacturing Company, Sterling, Ill., a corporation of Illinois
Filed Aug. 17, 1959, Ser. No. 834,174
2 Claims. (Cl. 160—40)

This invention relates to overhead door constructions and parts thereof, and particularly to lightweight overhead doors each including several door sections hinged together, each door section comprising a plastic panel mounted in a lightweight metal frame formed of aluminum or the like.

The overhead door constructions of the present invention are particularly adapted for use in home installations such as garages, the door being formed in sections disposed horizontally and arranged one above another and mounted for movement upon a track from a vertical door aperture closing position to a horizontal door aperture opening position. Such door constructions are also provided with counterbalance devices to aid in opening the door. Nonetheless, prior doors which have usually been formed of wood or metal have had certain disadvantages including warpage and swelling of the wood parts, rusting of the metal parts, and difficulty in operation by women and children because of the substantial weight thereof despite the use of counterbalance devices.

Accordingly, it is an important object of the present invention to provide an improved overhead door formed of a plurality of hingedly interconnected sections, each section including a plastic panel framed by corrosion and rust-resistant lightweight metal.

Another object of the invention is to provide an improved overhead door of the type set forth which will not warp, split, crack, or absorb moisture whereby to interfere with operation of the door.

Yet another object of the invention is to provide an overhead door construction of the type set forth which is substantially lighter than prior comparable wooden doors, the overhead door of the present invention having approximately one third the weight of prior wooden doors, whereby even double width doors of the present invention can be readily operated by women and children.

Still another object of the invention is to provide in an overhead door construction of the type set forth an improved sectional construction wherein each section is formed of a translucent plastic panel formed with ribs to provide sufficient stiffness and a pleasing appearance, the plastic panel being translucent to permit light to shine both ways therethrough, and a frame provided about the plastic panel whereby to cover all edges of the plastic panel and to prevent users from coming into contact with raw sharp edges.

Yet another object of the invention is to provide in an overhead door construction of the type set forth an improved joint between adjacent sections which insures a weather-tight fit therebetween and which will remain parallel during use due to the shape thereof.

Still another object of the invention is to provide an overhead door construction of the type set forth which has individual parts that are shaped and apertured to permit fabrication and sub-assembly thereof at one point and final assembly at the point of installation by the use of simple fasteners and tools.

A further object of the invention is to provide an overhead door construction of the type set forth which is neat in appearance and is so shaped that the parts thereof resist collection of dust thereon, the parts being further shaped so as to permit cleaning thereof by directing a stream of water thereon on both the inside and the outside, the water draining off readily due to the shape of the parts; the materials of construction of the door requiring no painting and being rust-resistant.

A still further object of the invention is to provide an overhead door construction which can be installed in double width sizes and which are structurally sound and yet are lightweight to permit operation thereof by women and children.

A further object of the invention is to provide a spring holder for an overhead door construction of the type set forth, the spring holder being automatically engageable upon closing of the door to hold the upper portion of the door against the header to prevent bending or flexing of the door inwardly when pressure is applied against the outer surface of the door.

A still further object of the invention is to provide an improved plastic panel and improved rails for overhead door construction of the type set forth.

Further features of the invention pertain to the particular arrangement of the elements of the doors, whereby the above outlined and additional operating features thereof are attained.

The invention, both as to its organization and method of operation, together with further objects and advantages thereof, will best be understood by reference to the following specification taken in connection with the accompanying drawings in which.

Figure 1:
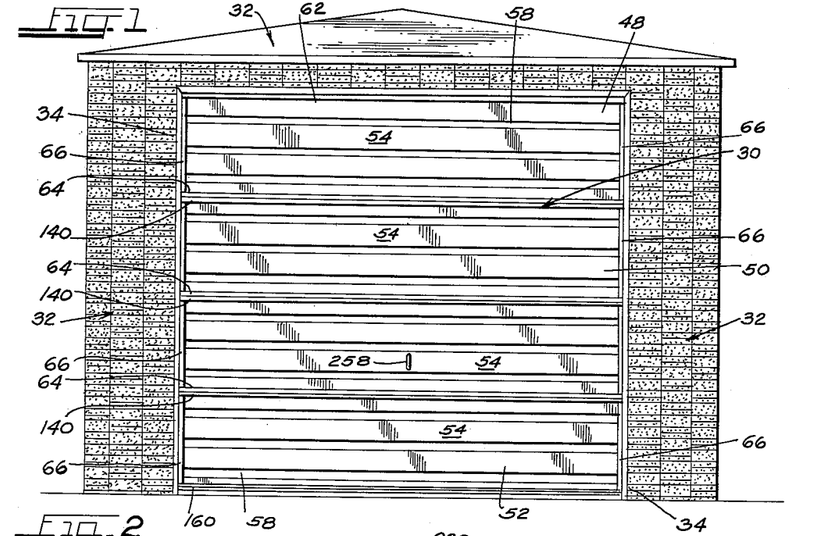
FIGURE 1 is a front elevational view of an overhead door made in accordance with and embodying the principles of the present invention, the door being shown installed in the door aperture of a garage and placed in the closed position thereof.

There is shown in FIG. 1 of the drawings an overhead door generally designated by the numeral 30 made in accordance with and embodying the principles of the present invention, the door 30 being shown mounted to close the door opening or aperture in a garage 32, the aperture in the garage 32 being surrounded by the usual frame 34 and including a header 36 (see FIG. 3A) and a door stop 38. The door 30 is mounted on tracks 40 to move from a vertical position to close the door opening to a horizontal overhead position away from the door opening in the garage 32, each of the tracks 40 to this end being provided with a vertical track section 42, a horizontal track section 44 and a curved track section 46 interconnecting the track sections 42 and 44.

Figure 3A:
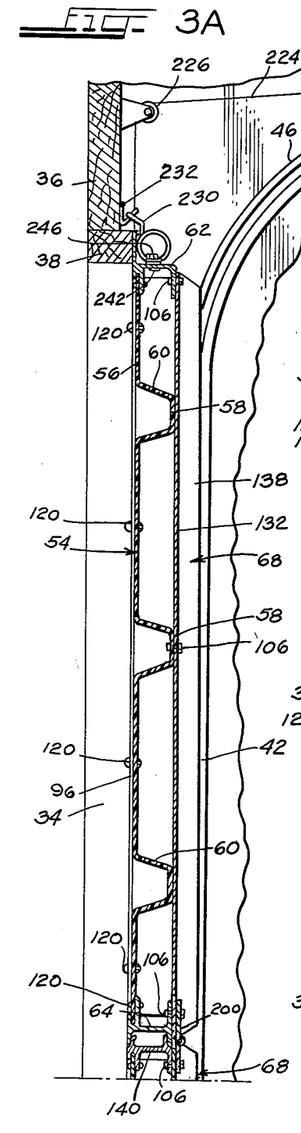
FIGS. 3A, 3B and 3C are enlarged views in vertical section through the door of FIG. 2 along the line 3—3 thereof, certain portions of the door being broken away.

The door 30 is formed as four separate door sections arranged in horizontal position one above the other and hingedly interconnected, there being a top door section 48, two intermediate door sections 50, and a bottom door section 52. Each of the door sections includes a plastic panel generally designated by the numeral 54 surrounded by a suitable frame. The plastic panels 54 in each of the door sections are identical and therefore only one will be described in detail with special reference to FIG. 3A. The plastic panel 54 extends the entire width of the door 30 and has a length substantially greater than the vertical extent thereof as illustrated in FIG. 3A and comprises a substantially flat body 56 provided with three horizontally disposed integral ribs 58 and complementary grooves or recesses formed thereon including walls 60 disposed at an angle of approximately 75° with respect to the body 56. The body 56 may be for example 0.045" thick, the flat portion of the rib 58 may have a width of 1", the total horizontal thickness of the panel 54 may be 1.1" and the panel may be 20" high and 18-20 feet long if necessary. Preferably the plastic panel 54 are formed of a synthetic organic plastic such as a polyester plastic suitably reinforced with nylon fibers and glass fibers to provide a shatterproof light transmitting or translucent panel. Such a panel is structurally strong, light in weight and flexible but provides a suitable door panel if provided with the proper frame. Such panels may be formed clear, translucent or opaque and may be colored if desired. The ribs 58 increase the strength of the panel 54 without detracting from the appearance thereof, the portions of the body 56 between adjacent ribs 58 being approximately 5".

Suitable framing is provided about the plastic panels 54 to provide the door sections 48, 50 and 52, the frame for each of the three different door sections being also different. The frame for the upper door section 48 is best seen from FIGS. 1, 2, 3A and 4 wherein it will be seen that there is provided a longitudinal top rail 62, a longitudinal upper joining rail 64, two end rails 66 and an intermediate muntin 68. The structure of the top rail 62 is best seen from FIG. 13 wherein an end view of the top rail has been shown. A front wall 70 is provided which extends the length of the rail 62 and is provided on the upper end thereof with a rearwardly directed flange 72 to provide reinforcement thereof, the front wall 70 abutting against the door stop 38 when the door is in the closed position as may be best seen in FIGS. 3A and 4. Formed integral with the front wall 70 and spaced from the lower edge thereof is a horizontal wall 74 which extends rearwardly from the front wall 70 and has formed on the rear end thereof a depending rear flange 76. A front flange 78 is formed integral with the horizontal wall 74 and spaced from the front wall 70, a portion 80 of the front wall 70 extending downwardly past the horizontal wall 74 and spaced from the front flange 78 a distance substantially equal to the thickness of the plastic panel 54 whereby to receive the upper edge of the plastic panel 54 in the groove or channel therebetween as may be best seen in FIGS. 3A and 4. Referring to FIG. 3A, it will be seen that the rear surface of the rib 58 lies in a plane which contains the rear surface of the rear flange 76. Suitable square apertures are formed in the rail 62 to receive fasteners to be described hereafter.

Figures 13, 14, 15, 16, 17, 19A, 19B:
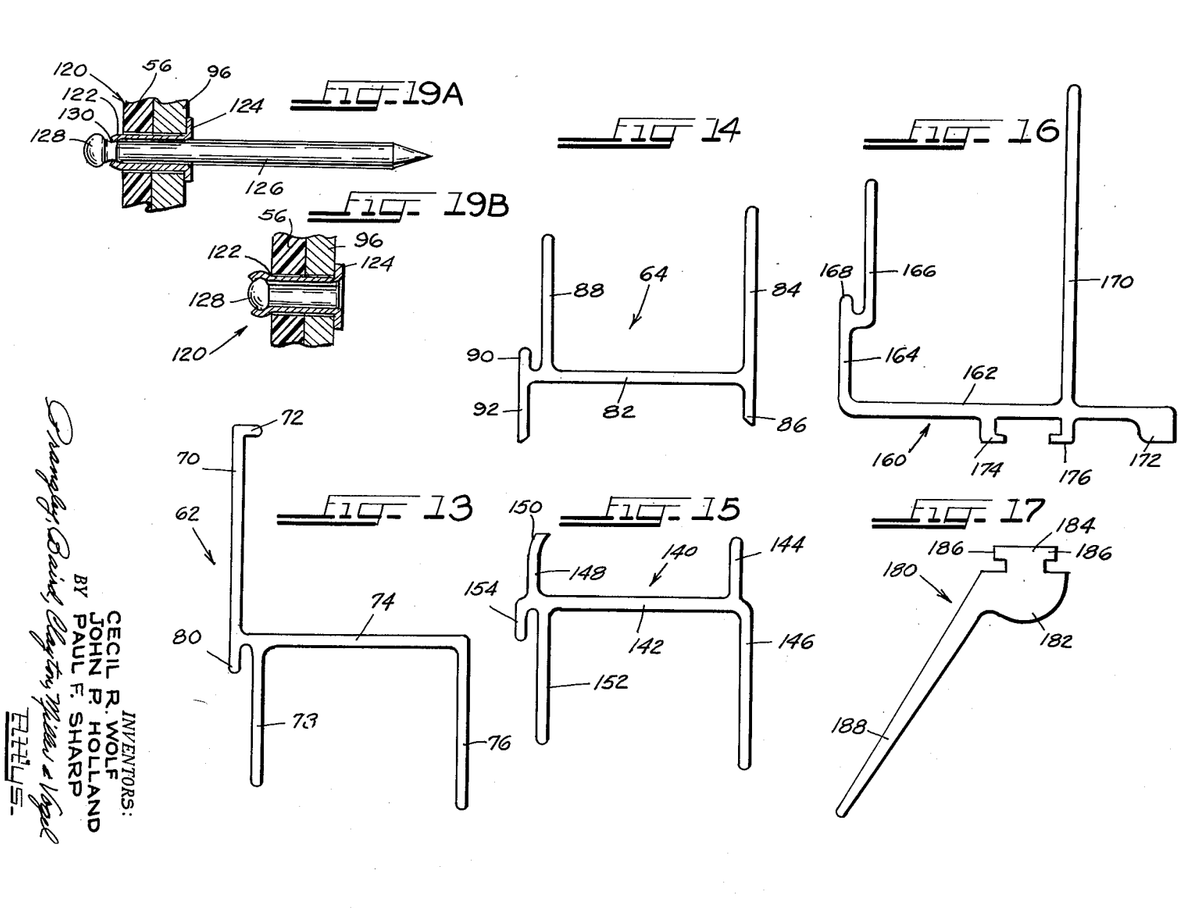
FIG. 13 is an end view of the top rail of the overhead door.
FIG. 14 is an end view of the upper joining rail of the overhead door.
FIG. 15 is an end view of the lower joining rail of the overhead door.
FIG. 16 is an end view of the bottom rail of the overhead door.
FIG. 17 is an end view of the seal adapted to be attached to the bottom of the overhead door.
FIG. 19A is a view in section showing a blind rivet applied to two interconnecting parts as utilized in the present invention and before setting thereof.
FIG. 19B illustrates the blind rivet in the applied position.

The construction of the upper joining rail 64 is best seen in FIG. 14, the rail 64 including a horizontal wall 82 provided on the rear edge thereof with a first upwardly extending rear flange 84 and a second downwardly extending rear flange 86. An upwardly extending front flange 88 is formed integral with the horizontal wall 82 and spaced back from the wall edge thereof and from an upwardly extending front flange 90 which is substantially shorter than the flange 88, the flanges 88 and 90 being spaced apart a distance substantially equal to the thickness of the panel 54 to receive the lower edge of the panel 54 in the groove or channel therebetween. Another front flange 92 is formed on the wall 82 and extends downwardly therefrom and in alignment with the front flange 90. Suitable square apertures are formed in the rail 64 to receive fasteners to be described hereafter.

Figure 18:
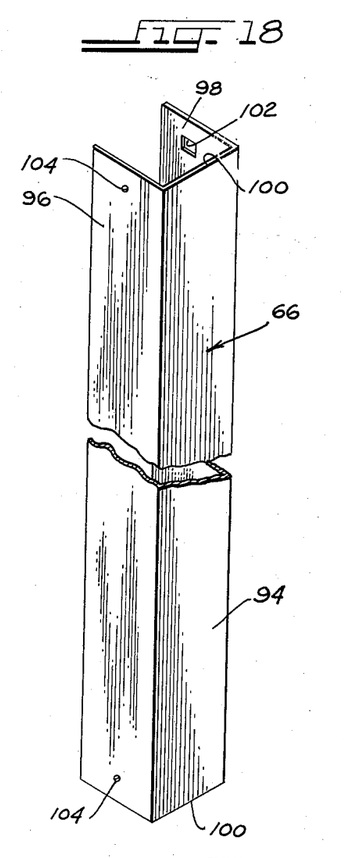
FIG. 18 is a perspective view of the end rail of the overhead door.

The ends of the upper section 48 are closed and framed by end rails 66. The construction of one end rail 66 is shown in FIG. 18, all of the other end rails being formed in a like manner. The end rail 66 includes an outer wall 94 which is provided with a front flange 96 and a rear flange 98 formed integral therewith and disposed substantially perpendicular thereto. The flanges 96 and 98 extend the entire length of the wall 94 whereby the end rail 66 is of square channel formation. From FIG. 8 it will be seen that the width of the flange 98 is slightly greater than that of the flange 96, the flange 96 being positioned to the front and the flange 98 to the rear in the assembled position. The flange 98 is provided with a plurality of square apertures 102 therein to receive bolts therethrough for assembly purposes. Similarly, the front flange 96 is provided with circular apertures 104 therein to receive blind rivets as will be explained more fully hereinafter.

Figure 8:
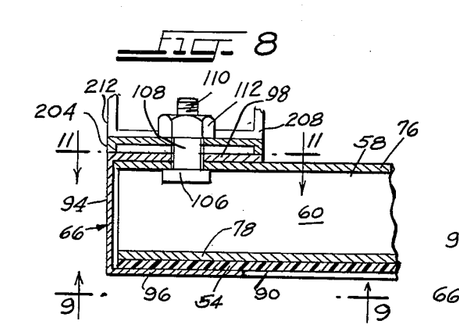
FIG. 8 is a fragmentary view in horizontal section substantially as seen in the direction of the arrows along the line 8—8 of FIG. 4.
Figure 9:
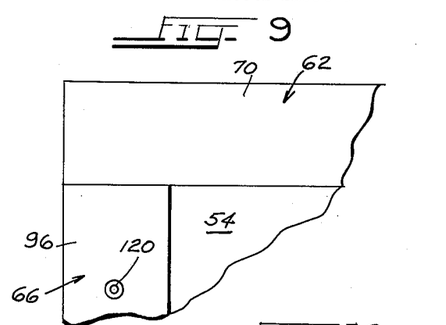
FIG. 9 is a view of the upper left-hand corner of the front side of the door substantially as seen in the direction of the arrows along the line 9—9 of FIG. 8.
Figure 10:
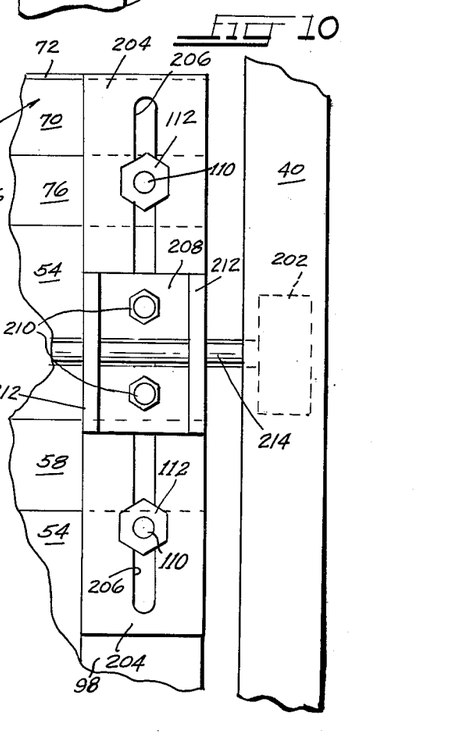
FIG. 10 is a view of the rear side of the upper left-hand corner of the door substantially as seen in the direction of the arrows along the line 10—10 of FIG. 4.
Figure 11:
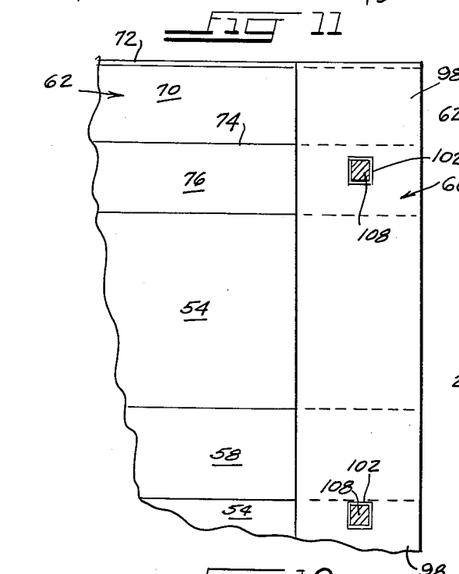
FIG. 11 is a view in vertical section as seen in the direction of the arrows along the line 11—11 of FIG. 8.
Figure 12:
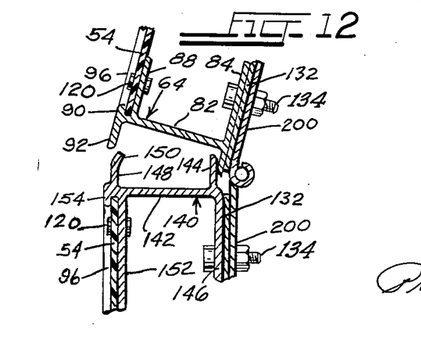
FIG. 12 is a fragmentary diagrammatic view illustrating the hinge action between adjacent sections of the door.

As may be best seen from FIG. 8 of the drawings, the flanges 96 and 98 of the end rail 66 are spaced apart a distance to receive therebetween the thickness of the plastic panel 54. The flange 96 lies in the same plane as the flange 80 of the top rail 62 and the end of the flange 96 abuts the flange 80. The lower end of the flange 96 is similarly disposed in the same plane as and abuts the flange 90 on the rail 64 at the bottom of the door panel 48. A carriage bolt 106 serves to interconnect the upper rail 62 to the end rail 66, the bolt 106 having a square shank 108 passing through the square aperture 102 in the rail 66 and through a similar aperture in the flange 76 of the rail 62 as well as through other parts which will be described more fully hereinafter. The outer end of the bolt 106 is threaded as at 110 to receive thereon a suitable nut 112 to hold the associated parts in the assembled relationship.

The end rails 66 are directly connected to the plastic panel 54 by means of blind rivets generally designated by the numeral 120 passing through apertures 104 in the rails 66 and through aligned apertures in the body 56 of the panel 54. Referring to FIG. 19A of the drawings, it will be seen that prior to assembly the blind rivet 120 includes a hollow cylinder 122 having an outwardly extending flange 124 formed on one end thereof and inserted in aligned apertures in the plastic panel body 56 and the flange 96. A shank 126 extends through the cylinder 122 and is provided on the end thereof disposed away from the flange 124 with an enlarged head 128 connected to the shank 126 by a reduced neck portion 130. By grasping the shank 126 and pulling to the right as viewed in FIG. 19A and working against the flange 124, the head 128 can be caused to expand the adjacent end of the cylinder 122 until the outer diameter thereof is greater than the diameter of the aperture in the body 56 after which the shank 126 pulls away from the head 128 at the neck portion 130 whereby to leave the parts in the condition illustrated in FIG. 19B from which it will be seen that the rivet 120 securely holds the two associated parts in assembled relationship. Preferably four of the blind rivets 120 are provided in each of the flanges 96. The blind rivets 120 can be readily applied from the outside of the door after assembly of the parts and without access to the panel body 56 and particularly the rear surface thereof.

Reinforcement is provided for the middle of the door section by means of the intermediate muntin 68. The muntin 68 is formed as a U-shaped channel and has the web 132 thereof (see FIG. 2) suitably secured to the top rail 62, the upper joining rail 64 and the plastic panel 54. More specifically referring to FIG. 5 of the drawings, it will be seen that the web 132 is secured to the rear flange 76 of the top rail 62 by means of a bolt 134 similar in character to the carriage bolt 106 described above (see FIG. 8) and provided with a cooperating nut 136 for interconnecting the parts. The web 132 is provided with side flanges 138 which give substantial rigidity to the muntin 68. The lower end of the muntin 68 is similarly connected to the rear flange 84 of the rail 64 by means of a bolt 134 and a nut 136. One aperture is formed in the web 132 intermediate the ends thereof to receive therethrough a nut and bolt 106 joining the intermediate rib 58 of the panel 54 to the muntin 68 at that point.

The above described frame for the upper door section 48 is rigid and provides a good support for the plastic panel 54, the upper and lower edges of the panel 54 being retained between cooperating flanges in the upper rail 62 and the rail 64, respectively, the ends of the panel 54 being disposed within the end rails 66 and the center portion of the panel 54 resting against the muntin 68 and being adhered thereto at one point by a bolt 106. All of the raw edges of the panel 54 are covered whereby to prevent contact therewith by the user and all of the exposed edges of the frame members are similarly rounded for protection to the user.

Figure 3B:
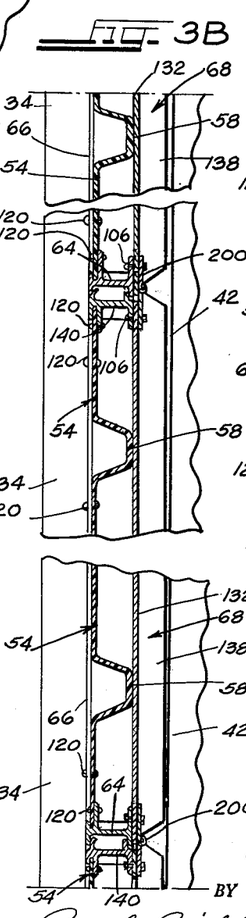

The intermediate door sections 50 are formed identical to each other and, accordingly, only one will be described in detail with particular reference to FIGS. 3B and 4 of the drawings. The plastic panel 54 utilized in the intermediate sections 50 is identical with that utilized in the top door section 48. The upper edge of the section 50 is formed by a lower joining rail 140, the lower edge is formed by an upper joining rail 64 and the ends are formed by end rails 66. The construction of the lower joining rail 140 can be best seen in FIG. 15 of the drawings wherein it will be seen that a horizontal wall 142 is provided having an upwardly extending rear flange 144 and a downwardly extending rear flange 146 offset rearwardly with respect to the flange 144. A first front flange 148 is formed integral with the wall 142 and extends upwardly therefrom and has the upper end 150 curved rearwardly for a purpose which will be explained more fully hereinafter. A first downwardly extending front flange 152 is formed on the wall 142 to the rear of the flange 148 and a second downwardly extending front flange 154 is formed forward of the flange 148 and spaced from the flange 152 to receive in the channel therebetween a plastic panel 54. The flanges 144 and 148 are spaced apart a distance such that they will fit and lie between the flanges 86 and 92 on an associated upper joining rail 64 as can be best seen in FIGS. 3B, 4 and 7.

The end rails 66 utilized in the intermediate door sections 50 are the same as those utilized in the top door section 48 and cooperate with the rails 64 and 140 substantially in the same manner as they cooperate with the rails 62 and 64, respectively, as described above with respect to the top door section 48. Carriage bolts are also utilized to interconnect the rails as described above and blind rivets are utilized to connect the plastic panel 54 to the end rails 66 of the intermediate door sections 54. A muntin 68 is also provided to reinforce the center of the intermediate door sections 50, the muntin being attached in the same manner described above with respect to the top door panel 48.

The bottom door panel 52 is also formed from a plastic panel 54 surrounded by suitable rails providing a frame therefor. More particularly, the top of the door section 52 is formed by a lower joining rail 140, the bottom is formed by a bottom rail 160 and the ends are formed by end rails 66. The bottom rail 160 includes a horizontal wall 162 which is slightly thicker than the similar portions of the rails 62, 64 and 140 described above. The forward edge of the wall 162 has formed thereon an integral upstanding flange 164 which in turn has formed thereon a rearwardly offset flange 166 extending above the upper edge of the flange 164 and spaced from an upper flange 168 thereof to receive an edge of a plastic panel 54 therebetween. Intermediate the edges of the wall 162 is formed an integral upstanding flange 170 which extends above the upper edge of the flange 166. The rearmost edge of the wall 162 is provided with an enlarged thickened reinforcing portion 172 which extends downwardly therefrom and lends rigidity to the bottom rail 160. Also formed integral with the wall 162 and extending downwardly therefrom is a pair of spaced apart seal retaining flanges 174 and 176 which are adapted to receive an elongated seal 180 therebetween, the lower edges of the flanges 174 and 176 being inturned toward each other.

The assembly of the lower joining rail 140, the two end rails 66 and the bottom rail 160 about a plastic panel 54 to form the bottom door section 52 is substantially the same as the assembly of the corresponding parts to form the top door section 48. More specifically, bolts 106 and nuts 112 are utilized to join the frame members and blind rivets 120 are utilized to attach the vertical edges of the plastic channel 54 to the side rails 66. An intermediate muntin 68 is provided and is secured to the lower joining rail 140, the bottom rail 160 and the middle rib 58 of the plastic panel 54 by bolts 106 and nuts 112.

Figure 2:
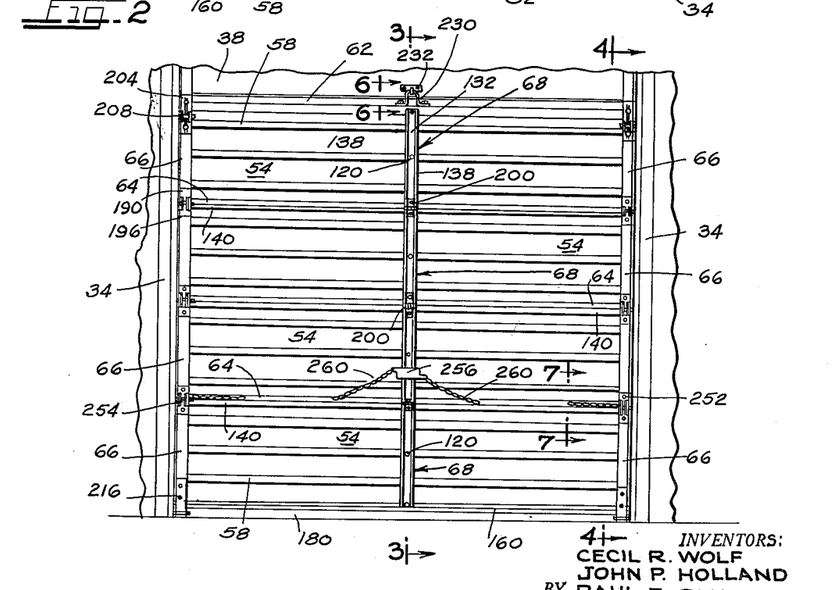
FIG. 2 is a rear elevational view of the door of FIG. 1.
Figures 4, 5, 6, 7:
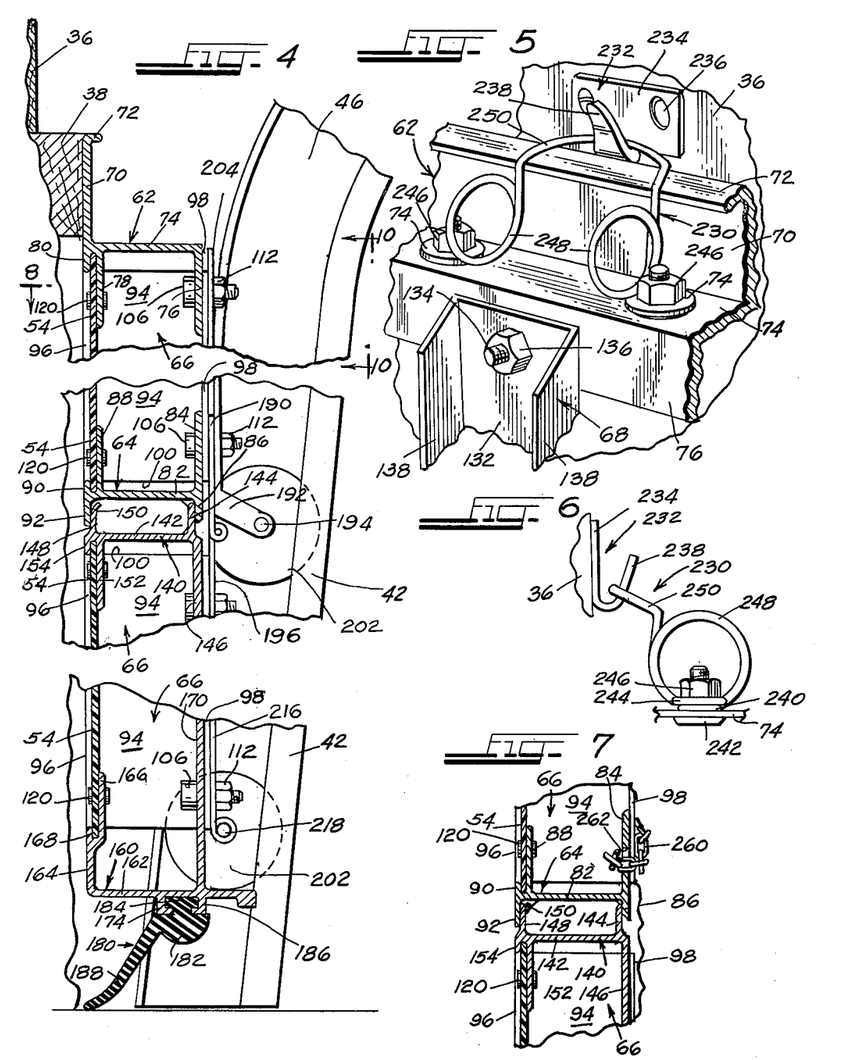
FIG. 4 is a view in vertical section on a further enlarged scale as seen in the direction of the arrows along the line 4—4 of FIG. 2, certain portions being broken away.
FIG. 5 is an enlarged fragmentary perspective view of the spring holder for the top of the door as seen from the rear thereof.
FIG. 6 is an enlarged view in vertical section of the spring holder substantially as seen in the direction of the arrows along the line 6—6 of FIG. 2.
FIG. 7 is a fragmentary view in section on an enlarged scale through the door of FIG. 2 along the line 7—7 thereof and illustrating particularly the latch chain mounting.

Adjacent door sections are hingedly interconnected at their opposite sides as can be best seen from FIGS. 2 and 4 of the drawings. More specifically, each of the upper joining rails 64 has a hinge plate 190 bolted thereto by means of bolts 106 and nuts 112 which pass through square apertures in the end rail flange 98 and the joining rail flange 84. A hanger 192 is provided and is held in position by the bolts 106 and nuts 112 which hold the hinge plate 190 in operative position. The hanger 192 extends rearwardly to receive and support a pintle 194. A similar hinge plate 196 is bolted to each of the lower joining rails 140, the bolt 106 passing through aligned square apertures in the lower joining rail flange 146, the end rail flange 96 and the hinged plate 196. The hinge plates 190 and 196 are hinged together and serve hingedly to interconnect adjacent door sections. Additional hinges 200 are disposed between the flanges 138 and lie within the intermediate muntin 68 and interconnect adjacent muntins in a hinged manner, the bolts 134 passing through aligned square apertures in the joining rail flanges 84 or 146 as the case may be, web 132 of the muntin 68 and the hinge plates of the hinges 200.

As has been previously stated above, the overhead door 30 is mounted on the track 40 to move between a vertical position to close the building opening and a horizontal position to remove the door from the building opening. To this end the pintles 194 carry on the outer ends thereof supporting wheels or rollers 202 which engage the track 40 and are held therein by the inturned flanges on the track 40. The upper edge of the top door section 48 is also provided with a pair of rollers and to this end adjustable top hangers 204 are secured to the end rails 66 and the top rail 62 by means of the bolts 106 and the nuts 112. The hangers 204 are provided with elongated apertures 206 therein which provide a limited adjustment thereof with respect to the frame of the top door section. Bolted on each hanger 204 is a bracket 208, the bracket 208 having rearwardly extending flanges 212 which carry therethrough a pintle 214 supporting a wheel 202. The lower edge of the bottom door section 52 at each side is also provided with a bracket 216 bolted to the bottom rail 160 by means of bolts 106 passing through aligned square apertures in the rail flange 170 and the bracket 216. The bracket 216 carries a pintle 218 supporting a wheel 202 within the track 40.

In order to facilitate opening of the door 30, a counterbalance system has been provided in the form of a spring 220 mounted at one end on the bracket 222 fixed to the garage and having the other end attached to a cable 224 that passes over a pulley 226 and is attached to the bracket 216 on the lower edge of the door 30 by means of a headed stud (not shown) mounted thereon. The spring 220 is under tension when the door 30 is in the closed position and therefore counterbalances the major part of the weight of the door 30 as it is moved initially toward the open position. A good closure at the top of the door is provided by the top front wall 70 abutting against the door stop 38 and the adjustable plate 204 permits the wall 70 to be adjusted flush against the door stop 38 when the door is in the closed position, the elongated slots 206 permitting the plate 204 to be moved downwardly whereby to move the associated wheel 202 along the curved track section 46 toward the front of the door.

A good seal is provided between the bottom of the door and the underlying floor by the door seal 180, the structure of which can be best seen in FIGS. 4 and 17 of the drawings. The seal 180 preferably is formed in 8, 9 and 10 foot lengths whereby narrow doors utilize one piece and wider doors two pieces disposed end to end. Each seal 180 includes a body 182 having outwardly extending flanges 186 adapted to engage and cooperate with the flanges 174–176 on the bottom of the bottom rail 160. Extending downwardly from the body 182 and along the entire length thereof is a tapered flexible blade or flange 188 which is adapted to engage the floor or the ground beneath the lower edge of the door when the door is in the lowered position, preferably the door being adjusted so that the blade 188 is flexed or bent as shown in FIG. 4 to assure a good seal. The door seal 180 is preferably formed of rubber or some similar flexible material such as a synthetic organic resin. Due to the mounting of the seal 180 on the bottom rail 160, the seal 180 can be readily replaced.

The door is purposefully made light in weight and consequently has a relatively light gauge construction but due to this light gauge construction there will be a tendency of the door to bend or flex inwardly at the header when a strong wind blows against the front side thereof. The inward bending or flexing is greatest at the center of the door, the corners of the door being held against the door stop by the action of the wheels 202 within the tracks 40. In order to minimize any such inward bending or flexing, a spring holder has been provided in the center of the upper edge of the door to hold the center of the door firmly against the door stop. Referring particularly to FIGS. 5 and 6 of the drawings, it will be seen that the spring holder has been designated by the numeral 230 and cooperates with a strike 232 mounted upon the header 36. The strike 232 includes a mounting plate 234 attached to the header 36 by screws 236 and a rearwardly and upwardly extending tongue 238. The spring holder 230 comprises a piece of spring wire shaped to provide a part circular attachment portion 240 at each end thereof adapted to receive therethrough the shank of a bolt 242 passing through the wall 74 of the top rail 62. A washer 244 and a nut 246 are provided to hold each of the attachment portions 240 on the wall 74. Formed integral with the attachment portion 240 are coil spring portions 248 which are connected by a U-shaped engagement portion 250 adapted to receive the tongue 238 therethrough. The tongue 238 is shaped so that the spring holder 230 rises upwardly and disengages the tongue 238 as the door 30 is opened and conversely engages and receives the tongue 238 therethrough as the door is moved to the closed position. More specifically, as the spring holder 230 engages the strike 232 and reaches the very bottom, the spring is forced to give upwardly and tends also to shorten the distance between the door and the header pulling the door quite firmly to the door stop 38.

A latch mechanism is provided to hold the door in the down position including a left hand latch 252, a right hand latch 254, a lock and operator mechanism 256 and an exterior operating handle 258 (see FIGS. 1 and 2). Chains 260 interconnect the operator mechanism and the door latches 252 and 254, each chain passing downwardly from the operator mechanism 256 to the upper joining rail 64 positioned therebelow and through an opening therein and therealong behind and within the joining rail and then outwardly through a second opening to engage the associated door latch 252 or 254. It will be seen therefore that the joining rail 64 serves as the guide for the chains 260 so that no additional guide members are required.

As had been stated above, the panels 54 are formed of a plastic which will not rust, warp, split, check or swell. Preferably, each of the rails 62, 64, 66, 140 and 160 is formed of aluminum or an alloy thereof which will not rust, warp, split, check or swell. The door, therefore, will be substantially maintenance free in that it will not require painting, will not rust, and will not absorb moisture.

This construction also provides a lightweight door as compared to wooden or steel doors which have been utilized heretofore. For example, an 8' x 7' door made of wood weighs approximately 117 pounds installed, whereas a similar door made according to the present invention weighs only 37 pounds. The door of this invention and a standard door will have the same thickness, width and height and can be used in the same type opening without modification. Because the frame is formed of aluminum, the door stops may be set tighter to improve the seal about the door because the aluminum frame does not provide as much friction as an equivalent wooden door. All of these features insure that the door of the present invention can be operated easily by women and children with a minimum of effort.

The configuration of the plastic panels 54 also aids in operation of the door 30 since the ribs 58 provide "hand holds" at a plurality of places on both the inside and the outside of the door so that no heavy lifting handles are required and further, operators of doors of different heights will find hand holds at a point convenient for them.

The individual parts comprising the door are readily assembled using only the blind rivets and carriage bolts described. Preferably, the four door sections are assembled at the factory including the riveting of the plastic panels 54 thereto, but the muntins and the various hardware to interconnect the sections and to mount the door on the tracks are not assembled at this time. Preferably the edges of the flanges 154 are rolled down tightly against the associated plastic panel 54 after assembly. This prevents water from being pulled by capillary action over the top of the plastic panel 54 to the inside of the door. No such rolling of the flange 80 is required since this flange is positioned under the header and is protected thereby. Similarly the flanges 90 and 168 do not require rolling because the capillary action is not sufficient to move the water the distance required to travel over the flanges 88 and 166 on the inside of the door. However, if the header does not provide sufficient protection for the flange 80 and if the flanges 88 and 166 are not high enough to prevent movement of water thereover, it would be desirable to roll the flanges 80, 90 and 168 as required.

The plastic panels 54 are riveted to the horizontal rails through the flanges 78, 88, 152 and 166. Generally the rivets are located on about 2 ft. centers. Rivets are also used to hold the plastic panels 54 against the end rails 66.

All of the openings for bolts are pre-punched at the proper locations, the holes for the bolts being square to receive the carriage head type of bolt to facilitate installation. Therefore it is not necessary to drill holes in the door at the point of installation and there is no requirement for the use of sheet metal screws. At the corners of the door where horizontal rails and the end rails overlap, the end rails are on the outside of the horizontal rails and the bolts in this case hold the door frame and the associated hardware together.

The door 30 has been provided with one row of muntins 68 on the door sections. Such a construction is suitable for doors having widths of 8 feet and 9 feet. On doors having widths of 10 feet to 16 feet, it is preferred to use two rows of muntins and the associated hinges 200 evenly spaced across the door. With such a construction, it is also necessary to provide a lock muntin in the center of the lower of the intermediate door sections 50 to receive the operating mechanism 256. A 16 ft. door utilizes three rows of muntins and hinges as will be illustrated in the door of FIGS. 20–23 and an 18 ft. door utilizes four rows of muntins and hinges plus one lock muntin in the center of the lower intermediate door section 50. The muntins in all cases are bolted to the door at the point of installation at the time that the hinges and mounting hardware are installed thereon.

Figure 3C:
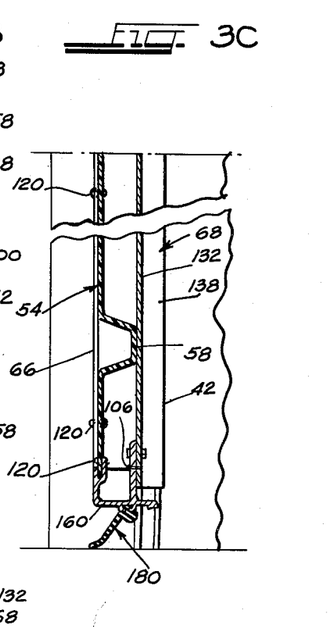

The joints between the adjacent door sections are weather-tight, as can be seen from FIGS. 3, 4 and 7 of the drawings, the upper joining rail 64 interlocking with and receiving flanges 144 and 148 of the lower joining rail 140. The adjustability of the top section 48 of the door by means of the mounting plates 204 assures a tight fit of the wall 70 against the door stop 38. The seal 180 likewise assures a good seal between the bottom of the door and the underlying floor. The joining rails 64 and 140 also are maintained in their parallel relationship even without the use of the intermediate hinges 200 due to the interlocking character thereof. Although the door is inherently watertight, all parts thereof can be readily cleaned by simply directing a stream of water from a hose thereagainst. More specifically, all portions of the plastic panels 54 can be readily cleaned in this manner, the sloping sides 60 of the ribs 68 facilitate ready cleaning on both the inside and outside thereof. Furthermore, there is a minimum of "shelf" on the plastic panels 54 for dust collection. All of the cross rails are channel shaped whereby to facilitate cleaning by washing with water and the spaces between the ends of the side rails 66 and the horizontal rails 62, 64, 140 and 160 assure that any water in the horizontal rails will drain out.

The use of the various rails to provide a frame around the plastic panels 54 serves also to cover all of the raw edges of the plastic panel 54. In addition, all of the frame parts and all of the rails have rounded corners so that persons operating the door cannot injure themselves thereon. The various hardware, such as the handle 258, the operating mechanism 256, and the door latches 252—254 are bolted directly to the aluminum frame and can be drawn tightly thereagainst and will not loosen in use since there is no shrinking of the aluminum frame as is the case with wood. The configuration of the plastic panels 54 is such also as to provide clearance for the various bolts interconnecting the frame parts and mounting the operating hardware on the frame. Because of the light weight of the door, the spring 220 can be readily adjusted so that substantially no door weight will rest on the seal 180.

The particular plastic panels 54 described above are particularly useful when formed translucent and reinforced with nylon fibers and glass fibers. Such a panel when ribbed as at 58 provides substantial stiffness to form a good closure and yet provides a neat appearance and clearance for attaching the frame parts to each other and the hardware to the frame. The light transmission through the translucent panels 54 is sufficient so that no glass is needed in the door or in other places in the associated garage structure. The entire garage is lighted because of the substantial door area available for light transmission. Furthermore, when the garage is lighted within at night, the door gives a very pleasing translucent appearance that is attractive yet discloses no details of the contents of the garage.

The present invention can be readily adapted for use with so-called "double width" doors having a width of the order of 16 ft. or more. Such a door and the modifications to the structure thereof are shown in FIGS. 20 through 23 of the drawings. Where applicable, the reference numerals applied to the parts of the garage door 30 of FIGS. 1 through 19 of the drawings have been applied to the like or same parts of the doors of FIGS. 20 through 23 of the drawings. Parts which differ structurally in a substantial amount are designated by the same numerals but with the suffix "a" added thereto.

Figure 20:
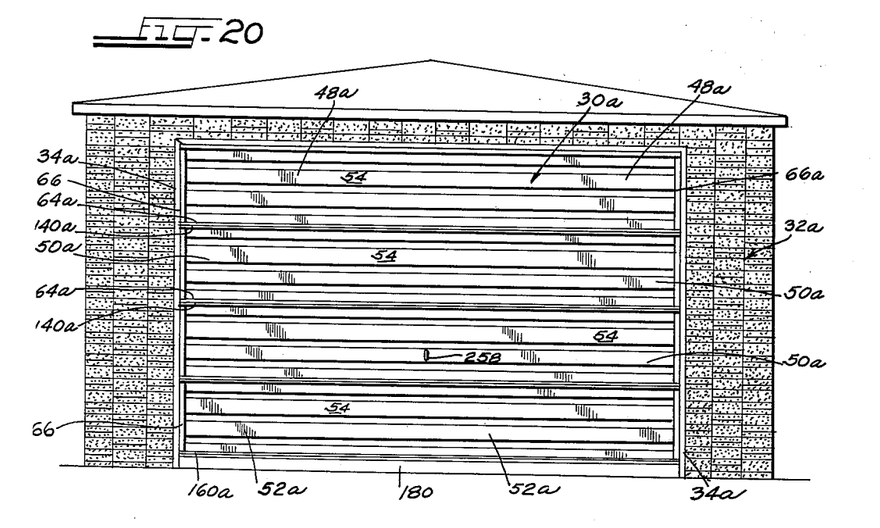
FIG. 20 is a front elevational view of a double width overhead door made in accordance with and embodying the principles of the present invention.
Figure 21:
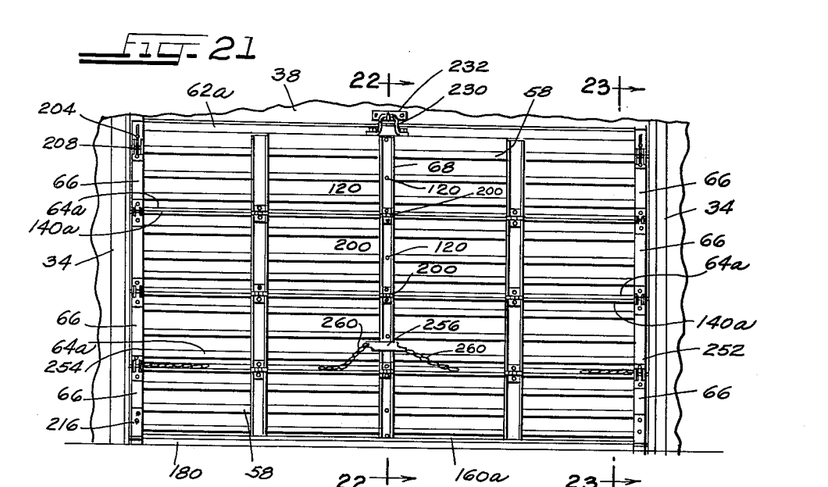
FIG. 21 is a rear elevational view of the door of FIG. 20.
Figures 22A, 22B, 22C:
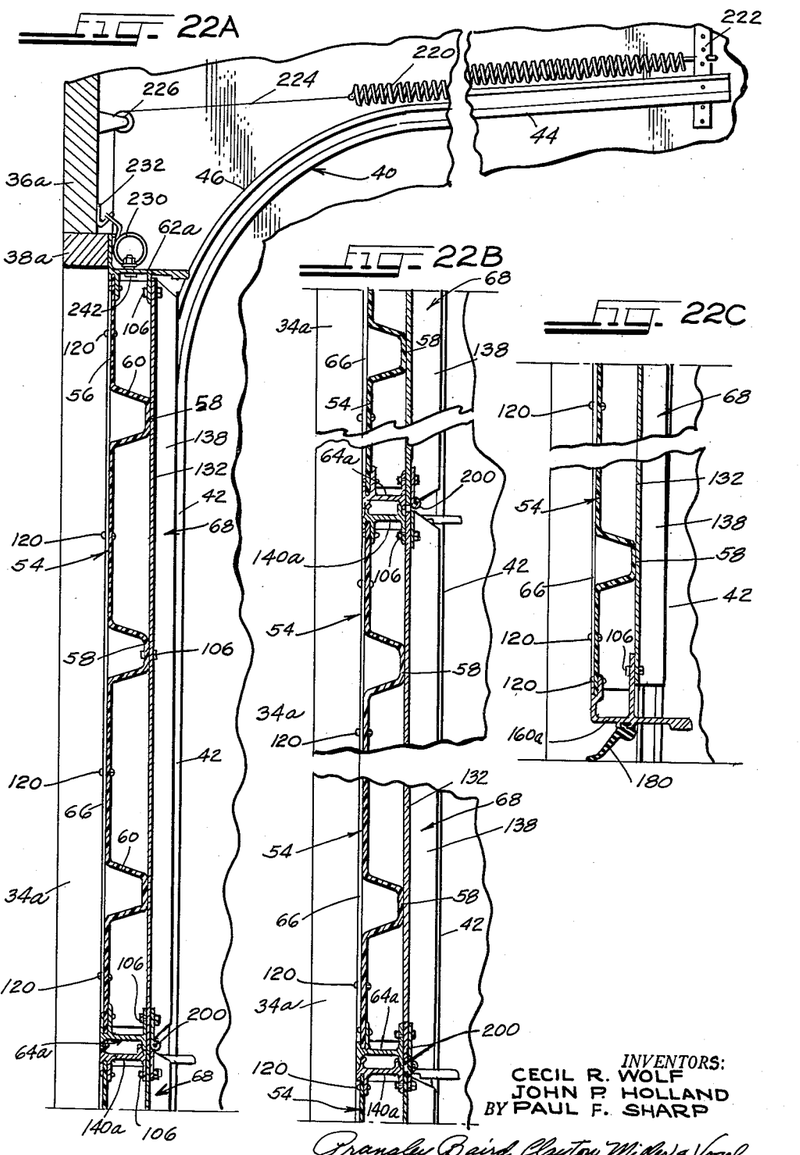
FIGS. 22A, 22B and 22C are enlarged views with certain portions broken away in vertical section through the door of FIG. 21 substantially as seen in the direction of the arrows along the line 22—22 thereof.

The double width door 30a of FIG. 20 has been illustrated as installed in a door opening in a garage 32a, the opening in the garage being bounded by a frame 34a. The door 30a may be for example 18 ft. wide and 7 ft. high and is formed in four sections including a top section 48a, two intermediate sections 50a, and a bottom section 52a. The upper edge of the door 30a cooperates with a header 36a (see FIG. 22a) and a door stop 38a. The door 30a is mounted for opening and closing movement upon a pair of tracks 40 of the type which have been described heretofore.

Each of the door sections includes a plastic panel 54 cut to the desired length and having the same structure as described above. A top rail 62a, an upper joining rail 64a, and two end rails 66 provide the frame for the plastic panel 54 of the upper door section 48a.

Figure 23:
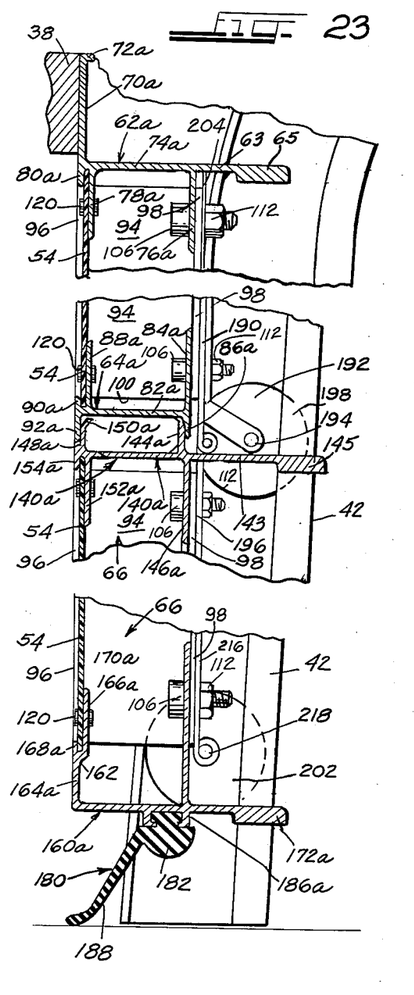
FIG. 23 is a further enlarged view in vertical section with certain portions broken away through the door of FIG. 21 substantially as seen in the direction of the arrows along the line 23—23 thereof.

Referring more particularly to FIG. 23 of the drawings, it will be seen that the top rail 62a is formed like the top rail 62 described above, but in addition thereto is provided with a rearwardly extending flange 63 formed as a continuation of the horizontal wall 74 and provided thereon with a thickened portion 65 which adds substantial rigidity to the top rail 62a. The upper joining rail 64a likewise is formed substantially as the upper joining rail 64 described above. The end rails 66 are identical with the ones described above and are assembled to the top rail 62a and the upper joining rail 64a in the same manner as are the like parts of the door 30. Three intermediate muntins 68 have been illustrated intermediate the edge of the rails 62a and 64a and the plastic panel 64 is secured to the end rail 66 by means of blind rivets 120 and to the intermediate muntins 68 by bolts in the same manner as described above in respect to the door 30.

Each of the intermediate door sections 50a also utilize a plastic panel 54 which is framed suitably by a lower joining rail 140a, an upper joining rail 64a and a pair of end rails 66. The lower joining rail 140a includes all of the elements of the joining rail 140 described above and in addition thereto includes a rearwardly extending flange 143 formed integral with and as a continuation of the horizontal wall 140 and further is provided on the edge thereof with a thickened reinforcing portion 145. The various parts are assembled with each other as are the corresponding parts of the intermediate door sections 50 described above utilizing three intermediate muntins 68.

The bottom door section 52a utilizes a plastic panel 54 bounded by a lower joining rail 140a, bottom rail 160a and a pair of end rails 66. The bottom rail 160a is formed similar to and includes all the elements of the bottom rail 160 described above and differs therefrom only in that the reinforcing portion 172a of the rail 160a is substantially heavier and wider than that of the reinforcing portion 172 of the bottom rail 160. The lower joining rail 140a, the bottom rail 160a, and the end rails 66 are assembled about the panel 54 to form the lower door section 52a in the same manner as the like parts are assembled to form the lower door section 52 described above. Three muntins 68 are provided and the plastic panel 54 is connected to the muntins 68 and the end rails 66 as described with respect to section 52. A seal 180 is provided on the bottom rail 160a, the seal 180 being preferably formed in two pieces and extending the entire width of the door 30a.

The various hardware utilized to mount the door 30a upon the tracks 40 is identical with that described above for the door 30 and, therefore, no separate description will be given here. Similarly, the door latches 252 and 254, the door operator 256 and the door handle 258 described above with respect to the door 30 are also utilized on the door 30a. The spring holder 230 and the cooperating strike 232 are also utilized on the door 30a and are of particular utility in this construction due to the substantial horizontal extent of the door 30a.

The double width door 30a embodies all of the desirable characteristics described above with respect to the door 30. The light weight of the double width door 30 as compared to a double width door of wood is particularly striking, a double width wooden door having an average weight of 290 pounds if it measures 18' x 7', whereas an equivalent door 30a made according to the present invention weighs only 92 pounds. The double width door of the present invention by utilizing the reinforcing portions 64, 85, 145 and 172a is sufficiently rigid and stiff in use and requires no extra bracing to provide the necessary rigidity. As a result, the double width door 30a is sufficiently light in weight that it can be operated by women and children and yet is structurally strong whereby to give a good tight closure for the door aperture in an associated garage.

Although two preferred forms of the invention have been described and shown in the drawings for purposes of illustration, it is to be understood that various changes and modifications can be made therein without departing from the spirit and scope of the invention and it is intended to cover in the following claims all such changes and modifications as may fall within the scope of the claims.

We claim:

1. An overhead door for use with a vertically arranged door opening and movable between a lower closed position and an upper open position with respect to the door opening, said door comprising a plurality of horizontally disposed and hingedly interconnected door sections, each of said door sections having a compressible water-repellent plastic panel extending substantially the width and height thereof and a frame surrounding said plastic panel; said plastic panel including a substantially flat sheet of plastic shaped to provide a forwardly disposed body with a longitudinally extending flange thereon along the top and bottom edges thereof and a plurality of horizontally extending and rearwardly projecting ribs; said frame including a spaced-apart pair of horizontal rails extending the width thereof and a pair of spaced-apart side rails interconnecting the adjacent ends of said horizontal rails, each of said horizontal rails having a pair of spaced-apart holding flanges adjacent to the front edge thereof extending substantially the length thereof toward the other horizontal rail and snugly receiving and holding the adjacent panel flange, the inner one of said holding flanges extending substantially beyond the longitudinal free edge of the outer one of said holding flanges and providing a flat surface extending the length thereof for supporting the adjacent panel flange, the longitudinal free edge of said outer holding flange being pressed into the associated panel flange and urging said panel flange against said flat surface to form a strong and watertight joint between said holding flanges and said panel flange, each of said side rails having an outer wall and a front wall substantially perpendicular to said outer wall and a rear wall substantially perpendicular to said outer wall and substantially parallel to said front wall, each of said outer walls covering the adjacent end of said plastic panel from the front surfaces of said body to the rear surfaces of said ribs, said front walls having the front surfaces thereof in substantially the same plane as the front surface of the forward depending flange of said upper horizontal rail and the front surface of the forward upstanding flange on said lower horizontal rail and extending therebetween.

2. An overhead door for use with a vertically arranged door opening and movable between a lower closed position and an upper open position with respect to the door opening, said door comprising a plurality of horizontally disposed and hingedly interconnected door sections, each of said door sections having a compressible water-repellent plastic panel extending substantially the width and height thereof and a frame surrounding said plastic panel; said plastic panel including a substantially flat sheet of plastic shaped to provide a forwardly disposed body with a longitudinally extending flange thereon along the top and bottom edges thereof and a plurality of horizontally extending and rearwardly projecting ribs; said frame including a spaced-apart pair of horizontal rails extending the width thereof and a pair of spaced-apart side rails interconnecting the adjacent ends of said horizontal rails, each of said horizontal rails having a pair of spaced-apart holding flanges adjacent to the front edge thereof extending substantially the length thereof toward the other horizontal rail and snugly receiving and holding the adjacent panel flange therebetween, the inner one of said holding flanges extending substantially beyond the longitudinal free edge of the outer one of said holding flanges and providing a flat surface extending the length thereof for supporting the adjacent panel flange, the longitudinal free edge of said outer holding flange being pressed into the associated panel flange and urging said panel flange against said flat surface to form a strong and watertight joint between said holding flanges and said panel flange, each of said side rails covering the adjacent end of said plastic panel and extending between said horizontal rails; the upper horizontal rail of each door section below the topmost door section cooperating with the lower horizontal rail on each door section above the lowermost door section to provide a junction therebetween, a depending front sealing flange on each of said lower horizontal rails adjacent to the front edge thereof extending substantially the length thereof, a depending rear sealing flange on each of said lower horizontal rails adjacent to the rear edge thereof extending substantially the length thereof, an upstanding front sealing flange on each of said upper horizontal rails adjacent to the front edge thereof extending substantially the length thereof and disposed rearwardly with respect to the associated depending front sealing flange and in face-to-face contacting sealing relationship therewith when said door is in the lower closed position thereof, an upstanding rear sealing flange on each of said upper horizontal rails adjacent to the rear edge thereof extending substantially the length thereof and disposed forwardly with respect to the associated depending rear sealing flange and in face-to-face contacting sealing relationship therewith when said door is in the lower closed position thereof, whereby said upstanding sealing flanges are telescopically received within said depending sealing flanges to form a weather-tight seal between the associated adjacent door sections in the lower closed position of said door.

References Cited in the file of this patent

UNITED STATES PATENTS

| | | |
|---|---|---|
| 1,724,995 | Dautrick | Aug. 20, 1929 |
| 2,072,514 | Daniell | Mar. 2, 1937 |
| 2,327,778 | Ferris et al. | Aug. 24, 1943 |
| 2,426,052 | Rix | Aug. 19, 1947 |
| 2,805,450 | Schlytern | Sept. 10, 1957 |
| 2,863,503 | Stroup | Dec. 8, 1958 |
| 2,880,796 | Stroup | Apr. 7, 1959 |
| 2,892,496 | Stroup | June 30, 1959 |
| 2,916,089 | D'Orazio | Dec. 8, 1959 |
| 2,959,221 | Clapsaddle | Nov. 8, 1960 |

FOREIGN PATENTS

| | | |
|---|---|---|
| 1,155,299 | France | Apr. 24, 1958 |